May 7, 1929.  R. B. FERREBY  1,711,932
REVOLVING LIGHT
Filed June 20, 1927   2 Sheets-Sheet 1

Inventor
R. B. Ferreby
by Hazard and Miller
Attorneys

May 7, 1929.  R. B. FERREBY  1,711,932
REVOLVING LIGHT
Filed June 20, 1927  2 Sheets-Sheet 2

Inventor
R.B. Ferreby
by
Hazard and Miller
Attorneys

Patented May 7, 1929.

1,711,932

UNITED STATES PATENT OFFICE.

ROLLA B. FERREBY, OF LOS ANGELES, CALIFORNIA.

REVOLVING LIGHT.

Application filed June 20, 1927. Serial No. 199,998.

My invention is a revolving light operated by wind action, in which a flickering light of different colors may be given, or a flashing, reflecting light may be projected.

An object of my invention is a revolving light in which lenses or reflectors are rotated by the wind, these lenses or reflectors having a source of light centrally positioned relative to same, so that the light flashes periodically and in accordance with the rate of rotation of the lenses or reflectors. If lenses are utilized, it is preferable to have these of different colors to show distinct flashes; and if reflectors are utilized, these give distinct flashes in accordance with the angularity of the reflection of the light rays from the source of light and the observer.

Another object of my invention is the construction of a rotary device operated by wind power which may be utilized for a number of different purposes, such as an anemometer, or a light source of wind power, and in which three vanes or cups are utilized placed in a triangular relation to each other, so that the wind, in blowing into a cup which is more or less faced to the wind, circulates therethrough and is transmitted into the interior of one of the other cups, thereby giving a rotational force greater than if the cups or vanes are mounted in a directly reverse position so that one cup is faced to the wind while the opposite cup has its back to the wind.

Another object of my invention is mounting the lenses, reflectors or vanes on a suspended antifriction bearing structure with a bottom or base guiding bearing so that the frictional resistance of rotation of the structure is reduced. As a further detail, my invention comprises mounting an electric lamp centrally positioned and depending internally of the antifriction bearing, the light being held stationary in regard to the revolving lenses or reflectors.

An immediate use of my invention is in a revolving or flashing light which may be placed on an automobile and receive the flow of wind developed by the travel of the vehicle, thus causing rotation of the lenses or reflectors, and giving the flashes of light above mentioned.

One type or manner of constructing my invention is illustrated in the accompanying drawings, in which.

Figure 1:
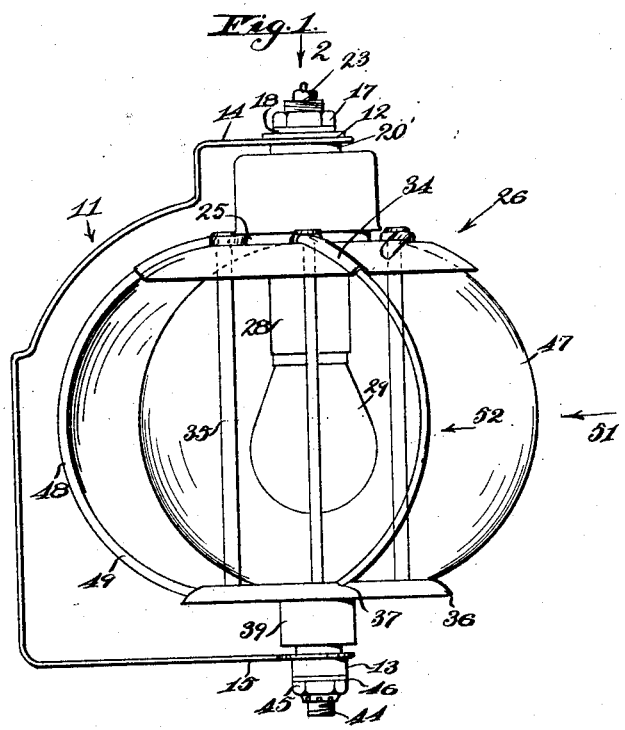
Figure 1 is a side elevation of the revolving light, taken in the direction of the arrow 1 of Fig. 2.

The mounted or stationary structure of my revolving light is substantially as follows:

In this case I illustrate as a support, a bracket 11, which is indicated as formed of a strap or bar of metal. This has an upwardly pressed cup 12 and an opening with a downwardly extending flange 13 at the top and bottom arms 14 and 15 respectively. A nut 15' fits in the cup 12 and has a sleeve 16 threaded therein. This sleeve is engaged by a lock-nut 17 on the upper side of the arm 12, there being a washer or gasket 18 below this nut. A cap 19 formed cup-shaped is positioned below the nut 15' and is retained in place by a nut 20 threaded on the sleeve 16. A ball retaining cup 21 has its upper part engaged between the nut 20 and the inner race 22 of a ball bearing 23. The outer race 24 of the ball bearing has a ring 25 connected thereto, this ring being preferably formed integral with a cover casing 26 for holding the lenses or reflectors in position, as hereunder set forth.

The sleeve 16 has an enlarged flange 27 at its lower end from which depends a tubular socket 28, in which an electric lamp bulb 29 may be connected by a bayonet type or other joint. One side of the lamp forms a ground with this socket. An insulating plate 30 pressed downwardly by a spring 31 presses the contact 32 against the center terminal of the lamp, the electric lead 33, with its insulation, passing through the sleeve 16. This structure holds the lamp stationary relative to the supporting structure.

The supporting frame for the lenses or reflectors is substantially as follows:

The cover casing 26 is downwardly dished and has a series of diagonal grooves 34 formed therein pressed up from underneath. Three bolts 35 depend from the cover casing 26, forming an equilateral triangle in their spacing, and these bolts extend through and support a base plate 36. This plate has diagonal downwardly pressed grooves 37 corresponding to the grooves 34. The central section 38 of the plate 36 has a sleeve 39 depending therefrom, and in this sleeve there is a bushing 40. A centering stud 41 is secured by a ring 42 in the flange 13 of the lower arm 15 of the supporting bracket 11. The lower stem section 44 is threaded and secured by a nut 45 with washers 46, thus forming a centering lower bearing for the revolving structure.

The lenses or reflectors 47 are three in number and each has a rim 48, the rim fitting in the upper grooves 34 and the lower grooves 37, so that when the bolts 35 are drawn tight, these lenses or reflectors are held in solid relation to the top and bottom plates of the revolving structure. The rims of each of the lenses or reflectors are each in a plane, as indicated by the numeral 49, and are preferably domed (see Fig. 4). It will be noted that the space between the planes 49, formed by the rims 48, forms substantially an equilateral triangle in which the lamp 29 is centrally positioned, and that one side of the rim of each of the lenses or reflectors is substantially in the line of the plane 49 of an adjacent reflector, these side edges being positioned close to the bolts 35.

Figure 2:
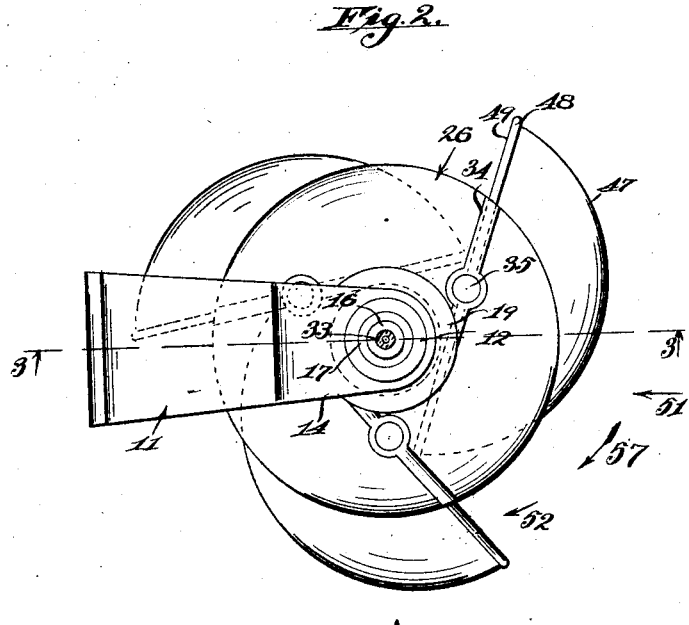
Figure 2 is a plan taken in the direction of the arrow 2 of Fig. 1.
Figure 3:
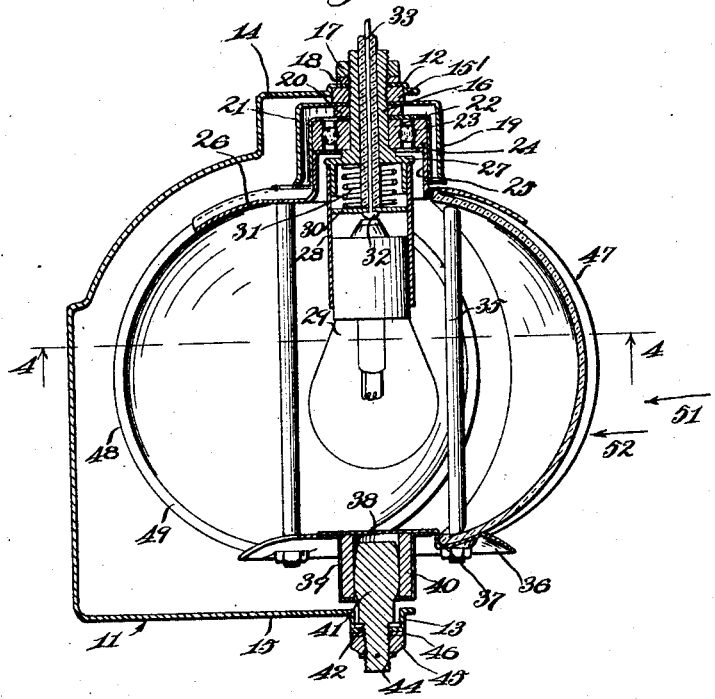
Figure 3 is a vertical longitudinal section on the line 3—3 of Fig. 2, in the direction of the arrows.
Figure 4:
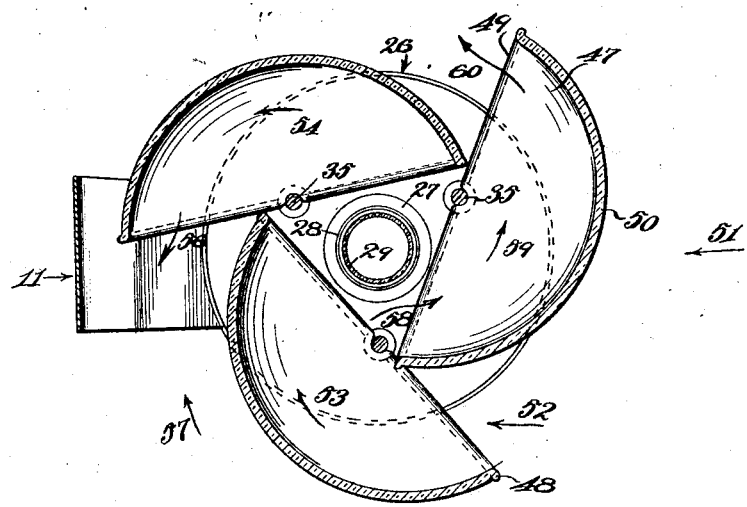
Figure 4 is a horizontal section on the line 4—4 of Figure 3, in the direction of the arrows.

The manner of functioning and operation of my revolving light is substantially as follows:

Referring to Fig. 4, the direction of movement of the wind relative to the device is indicated by the arrow 51. This wind enters the open side of one of the lenses or reflectors facing towards the front, as indicated by the arrow 52, and circulates through this lens or reflector, following the direction of the arrow 53. Part of the wind in leaving this lens or reflector passes to the rearwardmost lens, and follows in the direction of the arrow 54, having a clearance in the direction of the arrow 56, out of the revolving structure. It will be seen by this direction of the flow of the wind that there is a resultant force on the inside of these two domed structures tending to rotate the lenses or reflectors and their supporting structure in the direction of the arrow 57, this being in a clock-wise direction, having reference to Figs. 2 and 4. Some of the air currents, instead of following the direction of the arrows 53 and 54, are deflected in the path indicated by the arrows 58 and 59, following inside the lens or reflector which has its domed side towards the flow of the wind 51. This secondary air circulation has a free flow, as indicated by the arrow 60, out of such lens or reflector. This current of air, designated by the arrow 59, has a component force thrusting on the inside of the domed lens or reflector which has its rearward side to the direction of the wind, and to a great extent counteracts the direct wind force on the back of this lens or reflector.

It is manifest that as the device rotates that the relative direction and flow of the air through the curved or domed structures changes from that above described, but the general effect is, for the major portion of the time, in each rotation that there is a decided predominance of the component pressure on the inward side of each of the domed lenses or reflectors over that on the outside, tending to restrain the rotation of the device. This construction, therefore, utilizes the force of the air to rotate the domed or cupped structures with greater effect than in the ordinary anemometer when two or four cups are placed at the ends of arms and each pair of cups in a reverse direction. It is manifest that if my device is utilized as a rotary source of power for actuating an instrument or some mechanism, that the lamp and its socket may be eliminated, and thereby give a freer flow of air from one of the domes or cups to the other.

Where lenses are utilized, these may be of different colors so that a flashing light of different colors will be exhibited to an observer. If whole reflectors are used the observer does not receive the direct rays of light from the lamp, but the reflected light from the various reflectors in the rotation of the device. At slow speeds, this will give an intermittent light, and possibly at high speeds the effect will be a rapid flicker. It is obvious that if desired the lenses may be made in part of colored glass and part reflecting surface, thus allowing partial transmission of the direct rays of light and also the reflected light so as to give the flashes a longer duration. Many combinations of colors and arrangements of reflectors will be apparent as coming within the scope of my invention.

Various changes may be made in the principles of my invention without departing from the spirit thereof, as set forth in the description, drawings and claims.

I claim:

1. In the art described, the combination of upper and lower plates secured together, three cupped structures having rims, the rims being secured to the upper and lower plates, with one part of the rim of each cup extending towards the open side of another cup, means to mount said plates to allow rotation of the plates and the cupped structures of the unit by wind power.

2. In the art described, the combination of upper and lower plates having diagonal grooves, three bolts securing said plates together, the bolts being arranged forming an equilateral triangle, three cup-shaped structures having rims, the said rims being secured in the said grooves whereby the three cupped structures overlap and one side of the rim of each structure extends towards the open part of the cup of the adjacent structure, and means to mount the plates to allow free rotation.

3. A revolving light comprising in combination a source of light, three dome-shaped structures positioned surrounding said light, the rim of each structure extending towards the inside of the dome of an adjacent structure, and means to mount said dome-shaped structures to rotate freely around the light by wind power.

4. A revolving light comprising in combination a supporting frame, a lamp socket depending therefrom adapted to receive a lamp, a top plate rotatably mounted in relation to the lamp socket, a bottom bearing, a bottom plate rotatably mounted in relation to said bottom bearing, means connecting said plates together, three cup-shaped structures connected to said plates, said structures being arranged whereby the edge of one extends towards the inside of the cup of an adjacent structure, the said plates and the cupped structures rotating around the lamp socket by wind power.

5. A revolving light comprising in combination a frame, a sleeve depending therefrom, an antifriction bearing connected to the sleeve, a lamp socket depending from the sleeve, a top plate connected to part of said bearing, a centering stud connected to the lower part of the frame, a lower plate rotatable on said stud, means securing said plates together, and three cupped structures connected to said plates, said structures being arranged with one side of each extending towards the inside of the cup of an adjacent structure.

6. A revolving light comprising in combination a supporting frame, a sleeve depending from the upper part of the frame having an antifriction bearing mounted thereon and a lamp socket depending from the sleeve, a top plate secured to a revolving part of the said bearing, said plate having grooves, a centering plug secured to the lower part of the frame and having a lower plate with grooves, three bolts connecting said plates, arranged to form an equilateral triangle surrounding the lamp socket, three cupped structures each having a rim, said rims fitting in the said grooves, the cupped structures being arranged whereby one edge of each of the rims extends towards the cupped part of another cupped structure.

In testimony whereof I have signed my name to this specification.

ROLLA B. FERREBY.